United States Patent
Penney

(10) Patent No.: US 10,562,405 B2
(45) Date of Patent: Feb. 18, 2020

(54) MOVABLE WIRELESS CHARGING SYSTEM

(71) Applicant: Ford Global Technologies, LLC, Dearborn, MI (US)

(72) Inventor: John Marshall Penney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 15/978,737

(22) Filed: May 14, 2018

(65) Prior Publication Data

US 2019/0344668 A1  Nov. 14, 2019

(51) Int. Cl.
| | |
|---|---|
| *H02J 7/00* | (2006.01) |
| *B60L 53/38* | (2019.01) |
| *H01M 10/44* | (2006.01) |
| *H02J 7/02* | (2016.01) |
| *H02J 50/90* | (2016.01) |
| *B60L 53/12* | (2019.01) |

(52) U.S. Cl.
CPC ............... *B60L 53/38* (2019.02); *B60L 53/12* (2019.02); *H01M 10/44* (2013.01); *H02J 7/025* (2013.01); *H02J 50/90* (2016.02); *H01M 2220/20* (2013.01)

(58) Field of Classification Search
USPC .................................................. 320/108, 109
See application file for complete search history.

(56) References Cited

U.S. PATENT DOCUMENTS

| | | | |
|---|---|---|---|
| 5,617,003 A * | 4/1997 | Odachi | H01M 10/44 320/108 |
| 9,780,574 B2 | 10/2017 | Niizuma | |
| 9,869,105 B2 | 1/2018 | Vernon et al. | |
| 2015/0069969 A1* | 3/2015 | Wu | H02J 7/0047 320/109 |
| 2016/0052414 A1* | 2/2016 | Bell | G01M 17/007 320/108 |

FOREIGN PATENT DOCUMENTS

| | | |
|---|---|---|
| CN | 106828162 A | 6/2017 |
| GB | 2544962 A | 6/2017 |

* cited by examiner

*Primary Examiner* — Samuel Berhanu
(74) *Attorney, Agent, or Firm* — David Kelley; Brooks Kushman, P.C.

(57) ABSTRACT

A wireless charging station includes a movable charger having a primary coil and a controller having memory with a plurality of desired values for tire pressure sensor signal strength. The controller is programmed to position the primary coil relative to a secondary coil of a vehicle based on tire pressure signal strength values from the vehicle and the desired values.

15 Claims, 6 Drawing Sheets

MOVABLE WIRELESS CHARGING SYSTEM

TECHNICAL FIELD

This disclosure relates to wireless charging systems for vehicles and more specifically to wireless charging systems that communicate with tire pressure sensors of a vehicle to locate a charger to the vehicle.

BACKGROUND

Battery electric vehicles (BEVs) and plug-in hybrid electric vehicles (PHEVs) contain a traction battery assembly that acts as an energy source for the vehicle. The traction battery includes components and systems to assist in managing vehicle performance and operations. BEVs and PHEVs are connectable to charging stations to recharge the battery using energy from the power grid or other external power source.

Wireless charging stations may use induction to transfer electric power from a primary coil located in a charger to a secondary coil attached to the vehicle. Wireless charging stations work best when the primary and secondary coils are aligned with each other. Alignment typically occurs by positioning the primary coil under the vehicle at a location that is below the secondary coil. Many prior-art solutions focus on aligning the vehicle with a stationary charger. One such solution is disclosed in U.S. Pat. No. 9,869,105, which is owned by Applicant.

SUMMARY

According to one embodiment, a wireless charging station includes a movable charger having a primary coil and a controller having memory with a plurality of desired values for tire pressure sensor signal strength. The controller is programmed to position the primary coil relative to a secondary coil of a vehicle based on tire pressure signal strength values from the vehicle and the desired values.

According to another embodiment, a wireless charging station includes a movable primary coil and a controller having memory with a plurality of desired values for tire pressure sensor signal strength. The controller is programmed to ping tire pressure sensors for tire pressure signals, and, responsive to receiving the signals, position the primary coil relative to a secondary coil of a vehicle based on a comparison of signal strengths of the tire pressure sensors and the desired values.

According to yet another embodiment, a method of wireless vehicle charging includes requesting tire pressure signals from tire pressure sensors of a vehicle, and, responsive to receiving the signals, positioning a primary coil of a charger relative to a secondary coil of the vehicle based on a comparison of signal strengths of the tire pressure sensors and predetermined desired signal-strength values of the tire pressure signals.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
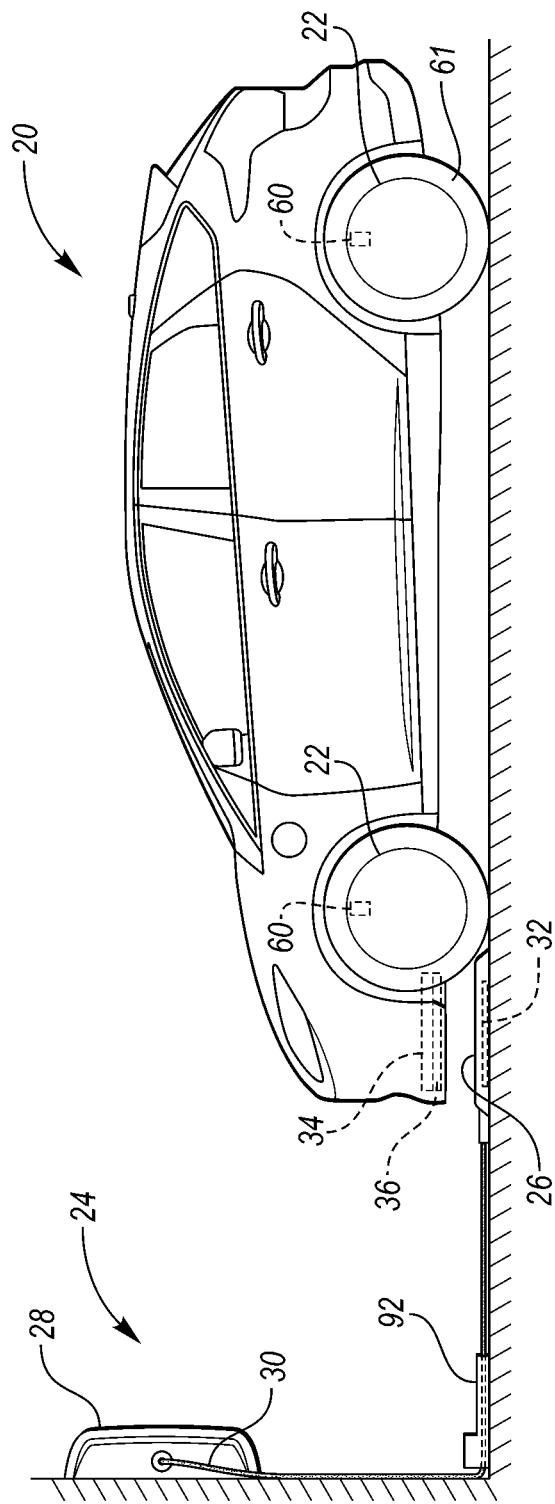
FIG. 1 is a diagrammatical elevation view of a vehicle and a charging station for charging a traction battery of the vehicle.

Referring to FIG. 1, an electric vehicle 20 includes wheels 22. Some of the wheels may be driven by at least one an electric machine. The electric machine is powered by a traction battery assembly located on the vehicle. The traction battery assembly includes a plurality of cells configured to store electrical energy. During use of the vehicle, energy stored within the traction battery is discharged to power the electric motors. Periodically, the traction battery must be recharged to restore energy after a discharge cycle. The vehicle 20 may be charged by a charging station that is electrically connected to the power grid or other external power source.

According to one embodiment, the vehicle 20 may be recharged by a wireless charging system 24. The wireless charging system 24 may include a charger 26, a control panel 28, and a high-voltage cable 30 that connects the charger 26 to the control panel 28. The control panel 28 may be mounted on a wall and is wired into the electric grid. The control panel 28 may include a controller having programming for executing charging of the vehicle 20. The charger 26 may be remote from the control panel 28 so that the charger 26 may be placed underneath the vehicle 20 during charging. The charger 26 includes a primary coil 32 that is electrically connected to the power grid via the control panel 28 and the high-voltage cable 30.

The vehicle 20 includes a charging unit 34 having a secondary coil 36. The charging unit 34 may be located on an underside of the vehicle 20 forward of the front axle. The secondary coil 36 is electrically connected to the traction battery. The system 24 uses induction to wirelessly transfer power from the charger 26 to the charging unit 34 to charge the traction battery. In induction charging, electrical current, supplied by the power grid or other source, is provided to the primary coil 32 to generate an electromagnetic field around the charger 26. When the secondary coil 36 is in proximate relation to the primary coil 32, the secondary coil 36 receives power from the electromagnetic field and converts it back into electric current. The current induced in the secondary coil 36 is subsequently transferred to the traction battery and the battery is charged.

Proper alignment of the charger 26 and the charging unit 34 facilitates efficient induction charging. When the charger 26 and the charging unit 34 are misaligned, induction is diminished and the traction battery may be charged more slowly or not at all depending upon the severity of the misalignment. Ideally, the charger 26 is disposed under the vehicle 20 so that the primary coil 32 itself is directly below the secondary coil 36 during charging. In practice, some degree of misalignment is not detrimental as the electric field generated by the primary coil 32 is larger than the coil 32 itself, which allows the secondary coil 36 to be sufficiently disposed within the electric field despite not being perfectly aligned with the primary coil 32.

Rather than aligning the vehicle 20 with the charger, the charger 26 is movable to be aligned with the vehicle 20. The charger 26 may be a roving unit that can be autonomously driven under the vehicle 20 to align with the charging unit 34. The roving unit may include wheels or other means for propelling and steering the roving unit. Alternatively, the charger 26 may include a stationary base and a movable head that houses the primary coil 32. An actuation mechanism is attached between the stationary base and the movable head to allow the head to move and align the primary coil 32 with the secondary coil 36.

Figure 2:
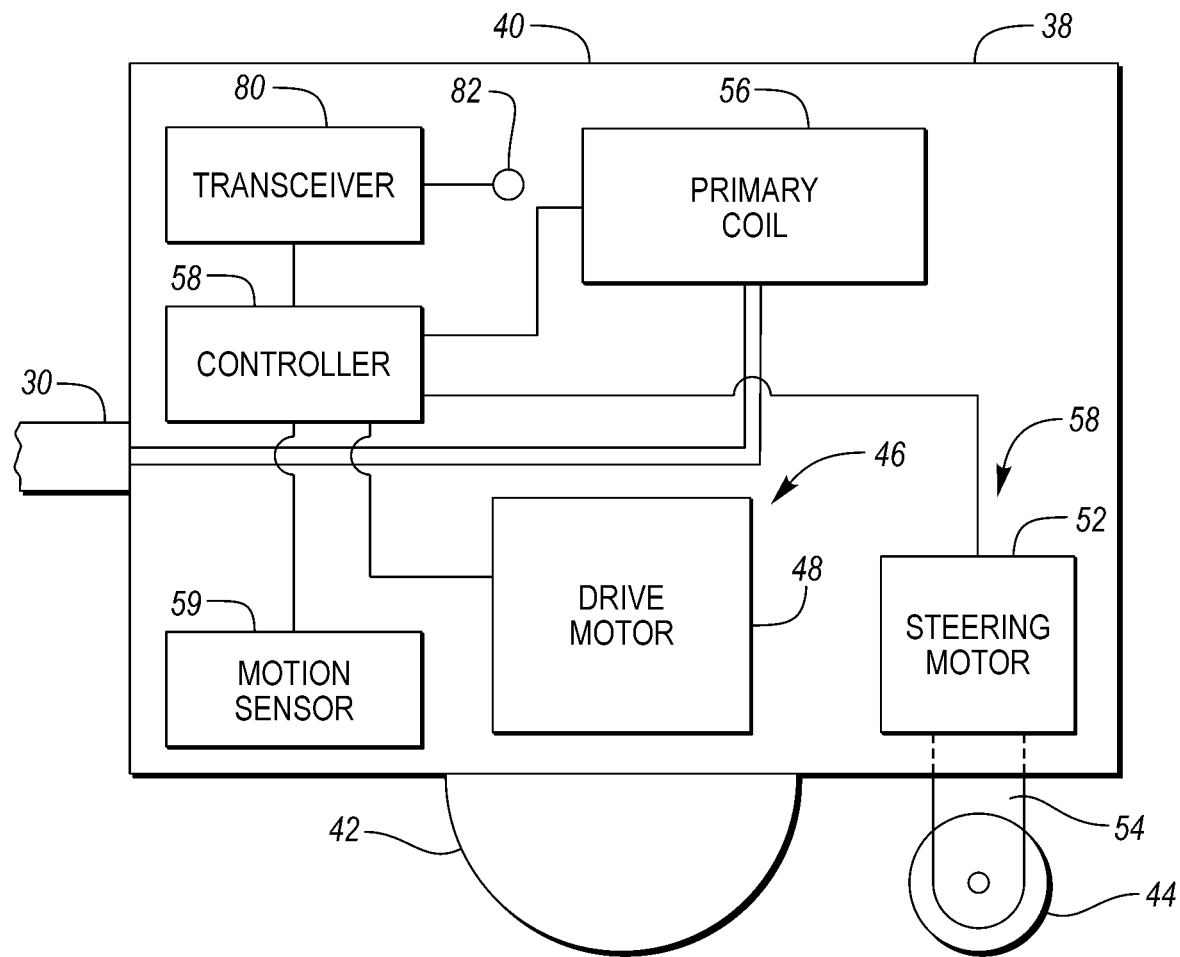
FIG. 2 is a schematic diagram of a roving charger of the charging station.

FIG. 2 illustrates one embodiment of a roving charger 38 of the wireless charging system 24. The charger 38 includes a body 40 that houses components of the charger such as the primary coil 56, which is electrically connected to the control panel 28 by the cable 30. The body 40 may be supported above the ground by wheels. Many types of propulsion systems may be used to move the roving charger 38. In one embodiment, the charger 38 includes driven wheels 42, e.g., a pair of driven wheels, and a maneuvering wheel 44. The wheels 42 are driven by a propulsion system 46 of the charger 38. The propulsion system 46 may include a drive motor 48 and a gearing arrangement (not shown) that operably couples the driven wheels 42 with the drive motor 48. The charger 38 may include a steering system 58 configured to turn the maneuvering wheel 44 so that the roving charger 38 may be steered. The steering system 50 may include fork 54 pivotally connected to the body 40 at a proximal end and connected to the maneuvering wheel 44 at a distal end. Pivoting of the fork 54 turns the maneuvering wheel 44 to steer the charger 38. The fork 54 may be pivoted by a steering motor 52 operably coupled to the fork 54. In another embodiment, the charger 38 may employ omni wheels, which allow translation in both directions at the same time.

The roving charger 38 includes a controller 58. The controller 58 may be a computing system that includes one or more controllers. The controller 58 generally includes any number of microprocessors, ASICs, ICs, memory (e.g., FLASH, ROM, RAM, EPROM and/or EEPROM) and software code to co-act with one another to perform a series of operations. The controller also includes predetermined data, or "look-up tables" that are based on calculations and test data, and are stored within the memory. The controller 58 may communicate with other systems and controllers over one or more wired or wireless connections. Used herein, any reference to "a controller" refers to one or more controllers.

The controller 58 is programmed to autonomously drive the charger 38, for example, by controlling the propulsion system 46 and the steering system 50. A motion sensor 59 is configured to sense motion of the charger 38 and send signals to the controller 58. Signals form the motion sensor 59 may be used by the controller 58 to determine movement of the charger 38. The motion sensor 59 may be an optical sensor array, a suite of accelerometers, or a combination of the two.

Rather than adding dedicated sensors and hardware to orient the charger 38 to the vehicle 20, the charger 38 may utilize data from sensors commonly installed on vehicles in order to locate the charger 38 with the charging unit 34. Most modern vehicles include tire pressure sensors that output a signal that can be detected by the charger 38. The charger 38 may use the signals from the tire pressure sensors to determine the location of the charging unit 34, and drive the charger 38 accordingly. This will be described in more detail below.

Figure 3:
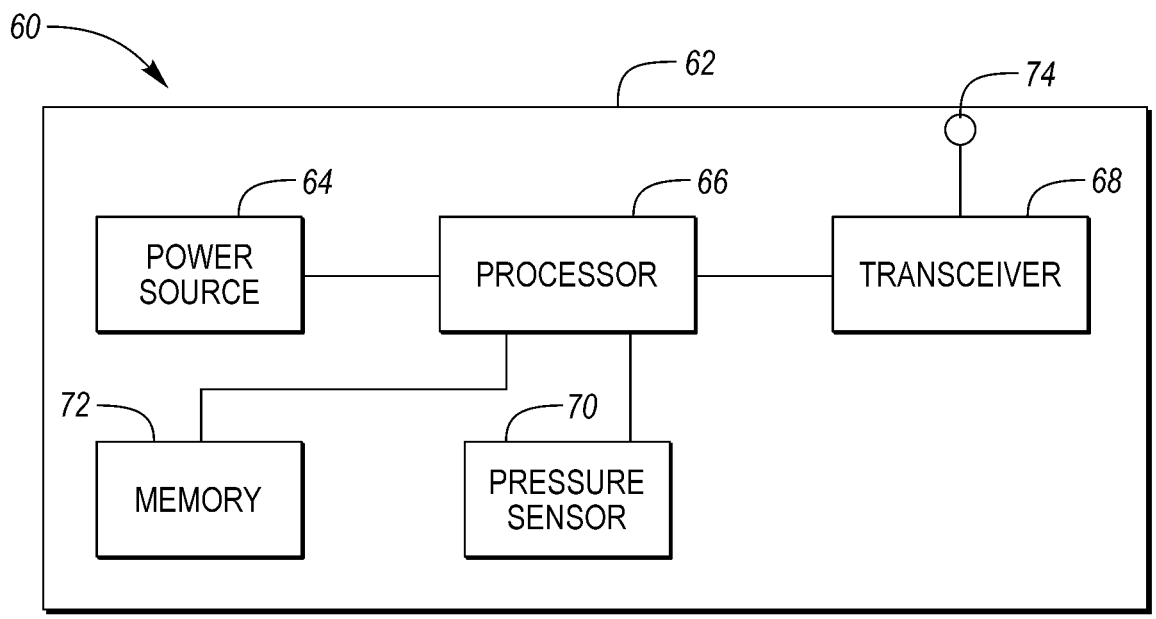
FIG. 3 is a schematic diagram of a tire pressure sensor.

Referring to FIGS. 1 and 3, each of the wheels 22 may include a tire pressure sensor 60 configured to measure an air pressure within the tire 61 and output a signal that indicates a value of the air pressure as well as other information such as a unique identifier. Each sensor 60 may include a sensor body 62 attached to a rim of one of the wheels 22. The sensor body 62 may house a power source 64, e.g., a battery, a processor 66, a transceiver 68, a tire pressure sensor 70, and memory 72. The processor 66 may be electrically connected to the other components of the sensor 60 and configured to send and receive data between these components to operate the sensor 60. For example, the processor 66 may be programmed to receive data from the pressure sensor 70 and output that data to the transceiver 68 which broadcasts a signal via an antenna 74. The signal may be an ultra-high radio frequency. The signal may include a value of the air pressure within the tire 61 as well as a unique identifier. The unique identifier identifies which of the sensors 60 the signal is associated with. Most vehicles include four wheels 22 and the unique identifiers allow the vehicle controller to determine which of the wheels 22 each of the signals is for. The unique identifier may be an identification number or a serial number. The transceiver 68 is also configured to receive signals. For example, the vehicle controller may periodically ping the sensors 60 for tire pressure readings. The sensors are configured to receive the ping, measure the tire pressure, and output the requested reading back to the vehicle controller.

Referring back to FIG. 2, the charger 38 includes a transceiver 80 configured to communicate with the tire pressure sensors 60. The transceiver 80 includes an antenna 82 that can send signals to and receive signals from the transceiver 68. The transceiver 80 is electrically connected with the controller 58, which includes programming for operating the transceiver 80. The controller 58 also includes programming to determine a signal strength of the received signals from the tire pressure sensors 60 and decode the unique identifier so that the controller can associate the signal strength to a specific wheel of the vehicle 20.

Radio signal strength (power density) is inversely related to the square of the distance. Thus, the distance of a transceiver from a signal source can be determined based on signal strength sensed at the transceiver. If at least three signals are available and the location of their sources are known, trilateration can be used to determine a position of the transceiver relative to the sources based on the received signal strength indications (RSSI).

Figure 4:
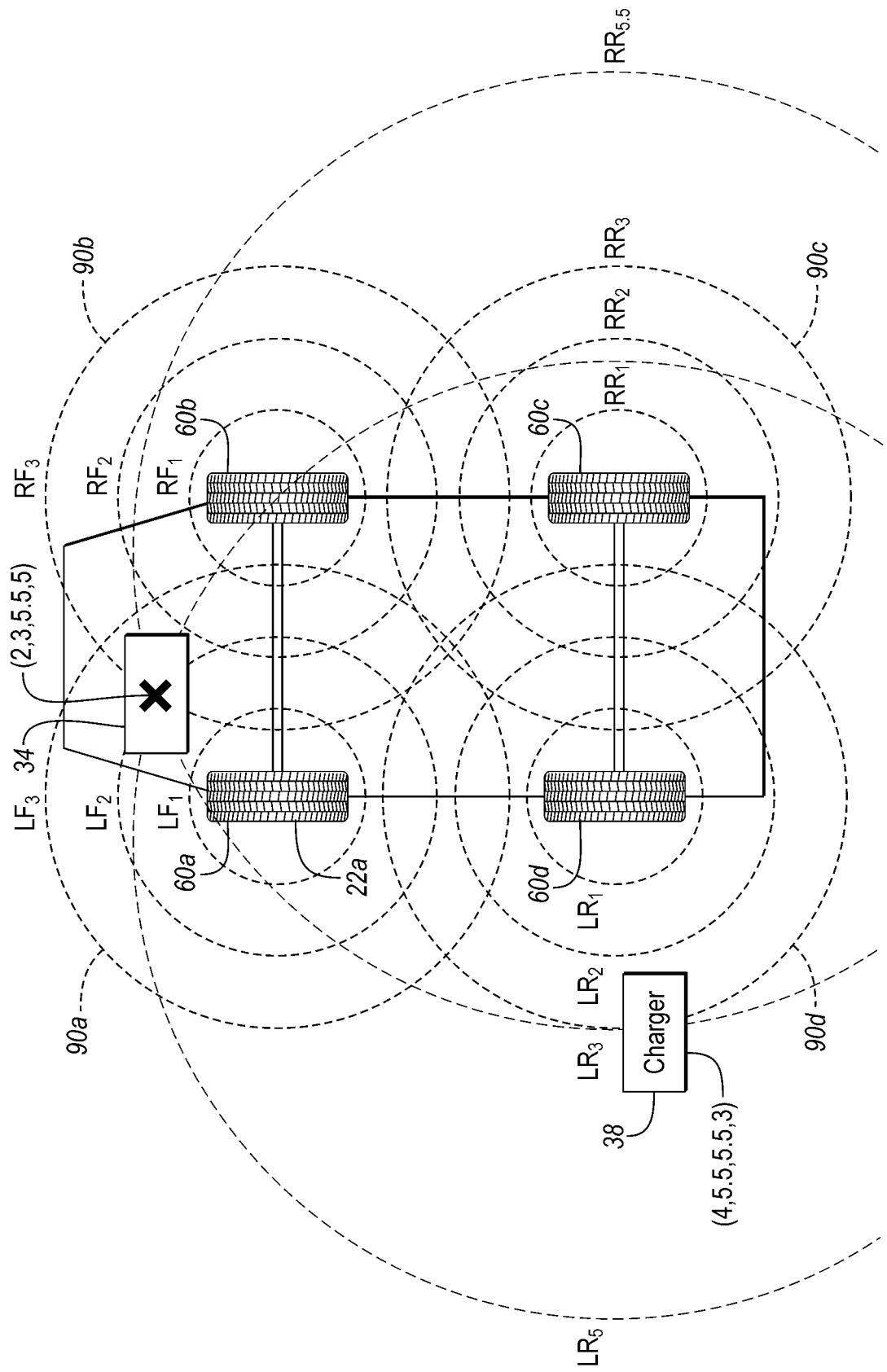
FIG. 4 is a schematic diagram of signal-strength map with the charger at a first location.

Referring to FIG. 4, the vehicle 20 includes four tire pressure sensors 60 located at the four wheels 22. The spatial positioning of the four wheels 22 and the charging unit 34 are fixed and are known. (The positions of the sensors 60 will vary based on the rotational position of each wheel 22, however, this minor variance does not affect the ability to trilaterate the position of the charger 38). A signal-strength map may be generated using signal-strength bands each indicating a radial distance from their associated sensor 60. For example, signal-strength bands 90a indicated radial distances from the tire pressure sensor 60a (front-left wheel), signal-strength bands 90b indicated radial distances from the tire pressure sensor 60b (front-right wheel), signal-strength bands 90c indicated radial distances from the tire pressure sensor 60c (rear-right wheel), and signal-strength bands 90d indicated radial distance from the tire pressure sensor 60d (rear-left wheel). The signal-strength bands propagate concentrically from the sensor 60 and each band represents a signal strength such as 1, 2, 3, etc. The intersecting bands create a coordinate system that can be used to specify locations relative to the vehicle. Interpolation can be used to designate locations between the bands. In one or more embodiments, each coordinate of the signal-strength map may include four values, one for each of the four tire pressure sensors 60, but only three values are need to trilaterate a position and thus only three of the tire pressure sensors may be used in other embodiments. For ease of description, each coordinate is expressed as (signal strength of sensor 60a, signal strength of sensor 60b, signal strength of sensor 60c, signal strength of sensor 60d), however, any order can be used. In the illustrated embodiment, the charging unit 34 is disposed in front of the front axle near the front left wheel 22a at location (2, 3, 5.5, 5). The coordinate of the of the charging unit 34 may be at the center of the secondary coil 36.

The charger 38 may be universal and usable with many different vehicles. The charger 38 may include learning features allowing the charger 38 to be programmed to a specific vehicle or set of vehicles, such as vehicle 20. For example, the controller 58 includes memory for storing the unique identifiers of each of the tire pressure sensors 60 and for storing the coordinate of the charging unit 34. The coordinate of the charging unit 34 may be saved in the controller 58 as the end location.

By measuring the signal strengths of the tire pressure sensors 60, the controller 58 can determine a current location of the charger 38 based on the signal-strength map and can operate the propulsion system 46 and the steering system 50 to drive the charger 38 to the end location by comparing its current location to the end location.

Control logic or functions performed by controller 58 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 58. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
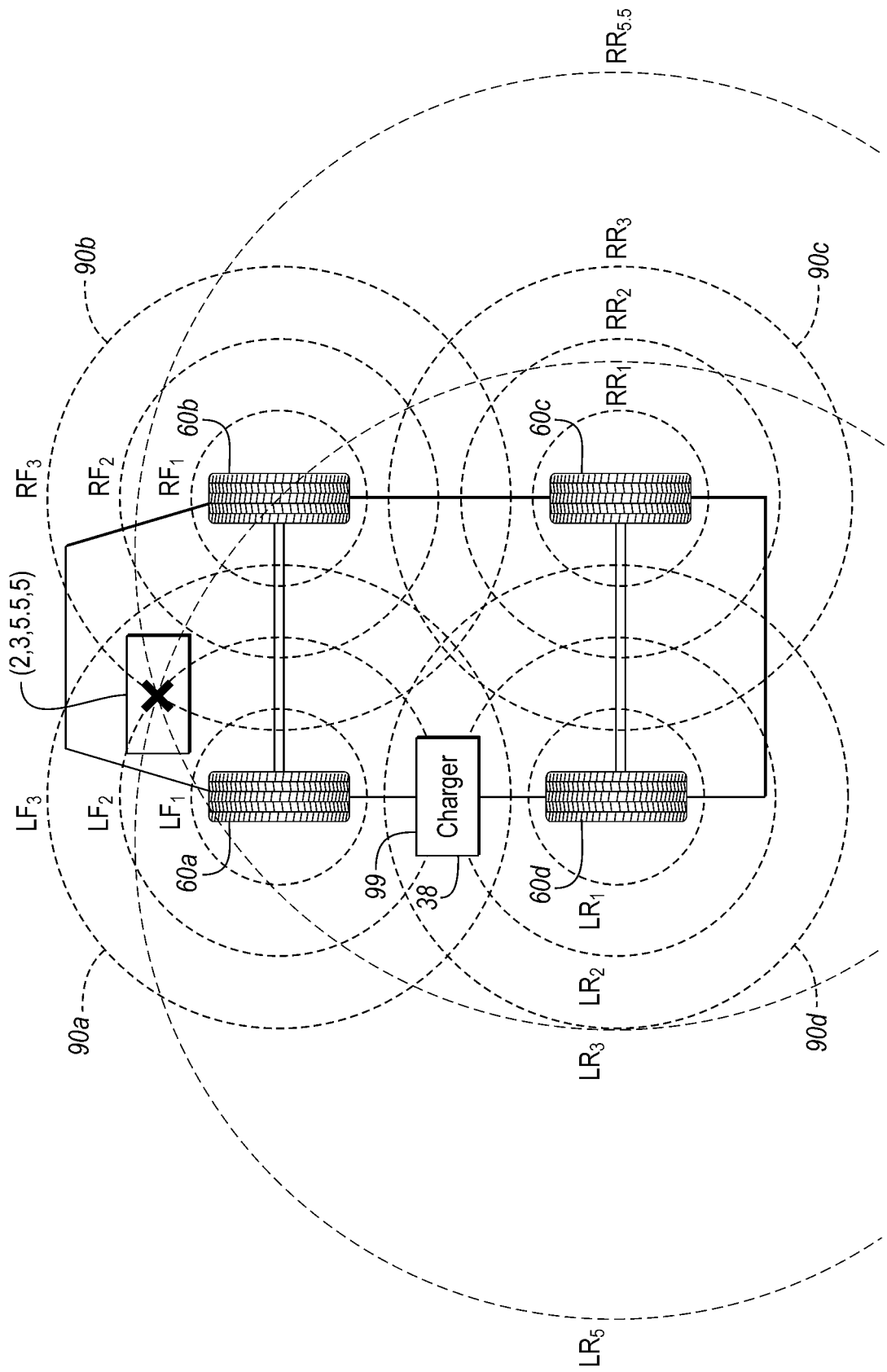
FIG. 5 is a schematic diagram of the signal-strength map with the charger at a second location.
Figure 6:
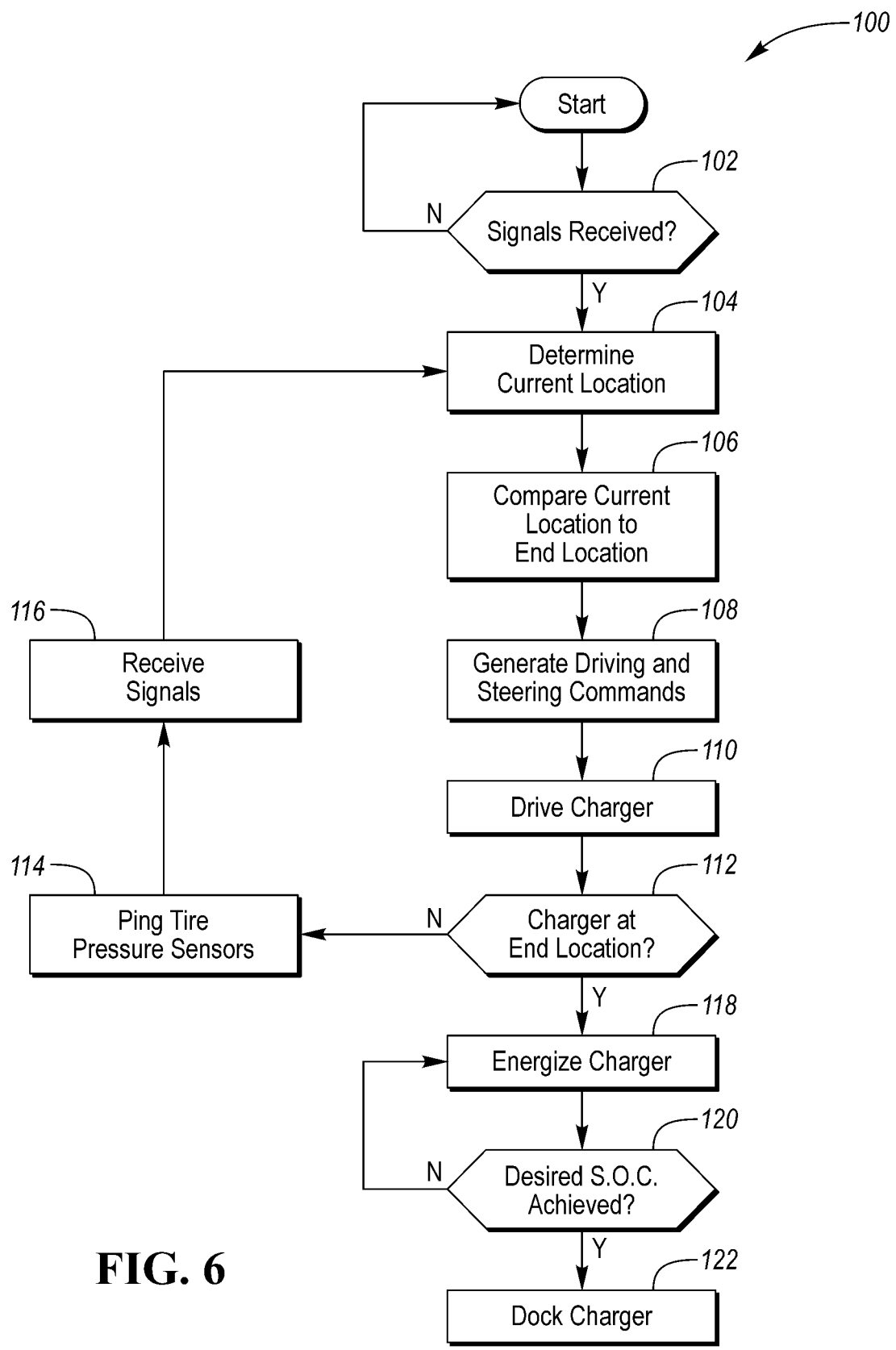
FIG. 6 is a flow chart of an algorithm for operating the charging system.

FIG. 6 is a flowchart 100 of an algorithm for operating the wireless charging station 24 to charge electric vehicles. With reference to FIGS. 1, 4, 5, and 6, the charger 38 may be configured to reside in a dock 92 of the wireless charging system 24 when not in use. The dock 92 may be a physical structure that houses the charger 38 when not in use, or may simply be a location on the floor of the garage. FIGS. 4 and 5 illustrate example successive movements of the charger 38 from the dock 92 towards charging unit 34 according the algorithm 100.

The charger 38 may be asleep until signals from the tire pressure sensors 60 are received at operation 102. The tire pressure sensors 60 may emit signals at key-off of the vehicle 20. For example, the vehicle controller may ping the tire pressure sensors 60 to send tire pressure signals, which are received by the transceiver 80 triggering the charger 38 to wake up. Once awoken, the controller 58 determines the current location of the charger 38 relative to the vehicle 20 at operation 104. The current location is determined using signal strengths, e.g., RSSI, of the four tire pressure sensors 60. The tire pressure signal strengths are translated into a coordinate of the above-described coordinate system. For example, FIG. 4 illustrates the charger 38 at the dock 92, which is located at (4, 5.5, 5.5, 3) on the signal-strength map.

At operation 106 the controller 58 compares the current location to the stored end location, and compares the current strength to the desired strength for each sensor 60 to determines a difference. In FIG. 4, for example, the controller 58 compares the current strengths of 4, 5.5, 5.5, 3 to the desired strengths of 2, 3, 5.5, 5 for sensors 60a-d, respectively, to determine strength differences.

At operation 108, the controller generates driving and steering commands based on the differences determined at operation 106. The controller sends the commands to the drive motor 48 and steering motor 52 to move a predetermined amount. The controller 58 may utilize the motion sensor 59 to provide feedback to confirm the amount of movement of the charger 38 based on this command.

At operation 110, the controller commands the propulsion system 46 and the steering system 50 to drive the charger 38 towards the end location. Once the driving step is complete, the controller checks if the charger 38 is at the end location at operation 112. As stated above, perfect alignment is not required and the charger 38 may be considered to be at the end location within an envelope of the end location. The envelope may be met when each of the signal strengths from sensor 60 are within a tolerance of their desired predetermined values.

The charger 38 may not reach the desired end location in the first driving iteration. For example, the charger 38 may move from the dock 92 to an intermediate location 99 (FIG. 5) in the first iteration. The intermediate location 99 is not at the end location, and thus a NO is determined at operation 112. Control then passes to operation 114 where the charger 38 pings the tire pressure sensors 60, i.e., the transceiver 80 sends a signal to the tire pressure sensors requesting a tire pressure reading. Once the charger 38 receives the signals from the tire pressure sensors 60, control passes back to operation 104. Operations 104 through 112 are repeated until the charger 38 is at the end location.

If yes at operation 112, control passes to operation 118 and the primary coil 56 is energized to charge the traction battery. Charging may continue until the desired state of charge of the traction battery is achieved at operation 120. The control panel 28 of the charging system 24 may communicate with the vehicle 20 to control the charging. Once charging is complete, the charger 38 may be returned to the dock at operation 122. The charger 38 is also configured to return to the dock 92 if charging is interrupted, e.g., the vehicle is to be driven away.

Figure 7:
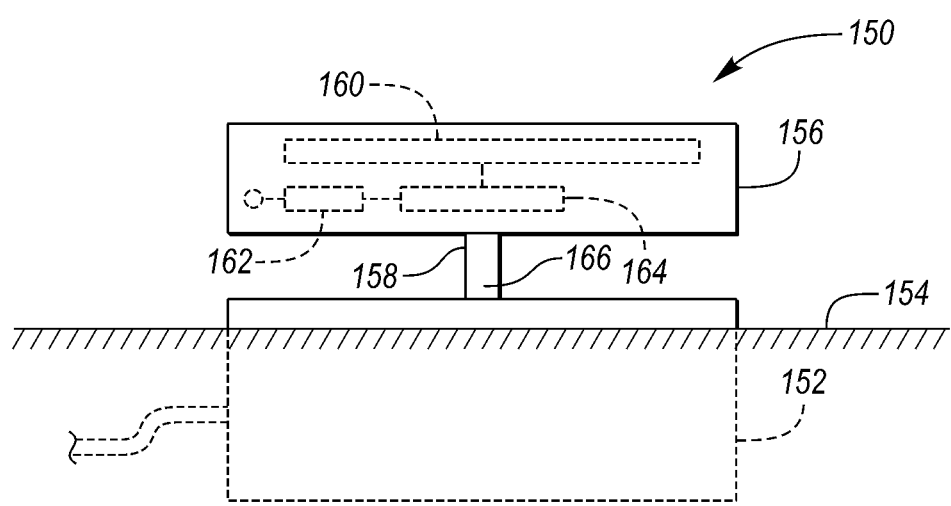
FIG. 7 is a diagrammatical elevation view of a charger according to an alternative embodiment.

Referring to FIG. 7, the charger 26 may be a stationary charger in some embodiments, such as stationary charger 150. The stationary charger 150 may include a base 152 that supports a movable head 156. The base 152 may be received in the floor 154 as shown in FIG. 7 or may rest on the floor so that the charger 150 is movable. The head 156 may be attached to the base 158 by an actuator arrangement 158. The actuator arrangement 158 may include an articulating arm 166 configured to move the head 156 vertically and horizontally so that the head 156 can be placed into alignment with the charging unit 34 of the vehicle 20. The articulating arm may be powered by one or more electric motors.

The head 156 may include a primary coil 160 cooperating with the secondary coil 36 of the charging unit 34 to induction charge the traction battery of the vehicle 20 as described above. A transceiver 162 is also disposed in the head 156 and is controlled by a controller 164. The controller 164 may be disposed in the head 156 as shown or may be disposed in the base 152. The transceiver 162 may be similar to the above-described transceiver 80 and is configured to communicate with the tire pressure sensors 60.

Like the above-described roving charger 38, the stationary charger 150 utilizes tire pressure signals from the sensor 60 to align the head 156 with the charging unit 34. The controller 164 includes an algorithm, similar to algorithm 100, for operating the actuator arrangement 158 to move the head 156 to the end location using RSSI of the tire pressure sensors 60. In the embodiment of FIG. 7, the control panel 28 and be omitted with the components of the control panel moved to the base 152. The cable 30 may also be omitted.

While the above-illustrated embodiments utilize four tire pressure sensors, only three signal sources are need for trilateration. Thus, any amount of tire pressure sensors of three or more may be used. For example, a tire pressure sensor of the spare tire may be used, i.e., five sensors, in the trilateration. Furthermore, larger vehicles may include more than four wheels and these additional wheels may be used in the trilateration.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A wireless charging station comprising:
   a movable charger including a primary coil configured to wirelessly transfer power to a secondary coil of charging unit of a vehicle and a transceiver configured to wirelessly communicate with a plurality of tire air-pressure sensors of the vehicle; and
   a controller including memory and programmed to:
      receive signals from the tire air-pressure sensors each including a measured value of air pressure within that tire and a unique identifier associated with that tire,
      determine a signal strength of each of the received signals,
      in response to a request for learning mode, save in the memory an end location of the movable charger in the form a coordinate corresponding to a location of the charging unit relative to the tire air-pressure sensors, wherein the coordinate includes a plurality of signal strengths of the tire air-pressure sensors at the charging unit, the signal strengths being arranged in the coordinate according to the unique identifiers, and
      in response to receiving signals from the tire air-pressure sensors, (i) determine a current location of the movable charger by translating the signal strengths and the unique identifiers of the received signals into a coordinate, (ii) comparing the current location to the end location by determining value differences between the coordinate of the current location and the coordinate of the end location, and (iii) moving the movable charger based on the difference to position the primary coil relative to the secondary coil.

2. The wireless charging station of claim 1, wherein the coordinate of the current location and the coordinate of the end location each includes at least three values.

3. The wireless charging station of claim 2, wherein the coordinate of the current location and the coordinate of the end location each includes four values.

4. The wireless charging station of claim 1, wherein the movable charger further includes a propulsion system.

5. The wireless charging station of claim 4, wherein the propulsion system includes wheels and an electric motor.

6. The wireless charging station of claim 1, wherein the movable charger includes a stationary base, a head housing the primary coil, and an articulating arm connected between the base and the head and configured to move the head.

7. A wireless charging station comprising:
   a movable primary coil disposed in a movable charger having a propulsion system configured to position the primary coil relative to the secondary coil, wherein the propulsion system includes wheels and an electric motor;
   a transceiver configured to receive tire pressure signals from tire pressure sensors and configured to send signals to the tire pressure sensors, and a controller including memory with a plurality of predetermined values for tire pressure sensor signal strength, and programmed to ping the tire pressure sensors for tire pressure signals, and responsive to receiving the signals, position the primary coil relative to a secondary coil of a vehicle based on a comparison of signal strengths of the tire pressure sensors and the predetermined values.

8. A wireless charging station comprising:

a movable charger including a primary coil, a propulsion system, and a transceiver configured to receive tire pressure signals of tire pressure sensors and configured to send signals to the tire pressure sensors, wherein the propulsion system is configured to position the primary coil relative to a secondary coil located on a vehicle;

a dock; and a controller including memory with a plurality of predetermined values for tire pressure sensor signal strength, and programmed to ping the tire pressure sensors for the tire pressure signals, responsive to receiving the signals, position the primary coil relative to the secondary coil based on a comparison of signal strengths of the tire pressure sensors and the predetermined values, and command the propulsion system to drive the charger to the dock responsive to completion of battery charging.

9. The wireless charging station of claim 8, wherein the propulsion system includes wheels and an electric motor.

10. The wireless charging station of claim 8, wherein the movable charger further includes a steering system.

11. The wireless charging station of claim 8, wherein the controller is further programmed:

receive signals from the tire pressure sensors each including a measured value of air pressure within that tire, and determine a signal strength of each of the received signals.

12. The wireless charging station of claim 11, wherein the comparison of signal strengths further includes (i) determine a current location of the movable charger by translating the signal strengths into a coordinate and (ii) comparing the coordinate to the predetermined values.

13. The wireless charging station of claim 8, wherein the movable charger further includes a steering system having a maneuvering wheel and a steering motor configured to actuate the maneuvering wheel.

14. The wireless charging station of claim 13, wherein propulsion system further includes a driven wheel, and a motor powering the driven wheel.

15. The wireless charging station of claim 8 further comprising a cable connected between the dock and movable charger, wherein the cable is electrically connected to the primary coil.

* * * * *